United States Patent [19]

Koenig

[11] 4,163,584
[45] Aug. 7, 1979

[54] FLUID PRESSURE BRAKING SYSTEM

[75] Inventor: James P. Koenig, Olmsted Township, Cuyahoga County, Ohio

[73] Assignee: The Bendix Corporation, Southfield, Mich.

[21] Appl. No.: 878,840

[22] Filed: Feb. 17, 1978

[51] Int. Cl.² ............................................. B60T 13/00
[52] U.S. Cl. ............................................ 303/7; 303/71
[58] Field of Search ........................... 303/7, 9, 13, 71

[56] References Cited

U.S. PATENT DOCUMENTS

| Re. 25,969 | 3/1966 | Valentine | 303/29 |
|---|---|---|---|
| 3,115,371 | 12/1963 | Valentine | 303/71 |
| 4,058,345 | 11/1977 | Klimek | 303/71 |

Primary Examiner—Trygve M. Blix
Assistant Examiner—Reinhard J. Eisenzopf
Attorney, Agent, or Firm—Ken C. Decker; William N. Antonis

[57] ABSTRACT

A fluid pressure braking system for an articulated vehicle includes a pair of manually operated, push-pull control valves and a pressure differential responsive dual supply valve. The inlet of one of the manually operated valves is connected to the fluid pressure source, and the outlet is connected to the parking brakes on the power portion of the articulated vehicle and also to one inlet of the dual supply valve. Another inlet of the dual supply valve is connected directly to the fluid pressure source. The outlet of the dual supply valve is connected to the inlet of the second manually operated control valve, the outlet of which is connected to the parking brakes on the towed or nonpowered portion of the articulated vehicle. Application of the spring brakes on both portions of the vehicle is effected by actuation of one of the valves, but release of the spring brakes on both portions of the vehicle requires actuation of both of the manually operated valves.

18 Claims, 1 Drawing Figure

U.S. Patent  Aug. 7, 1979  4,163,584
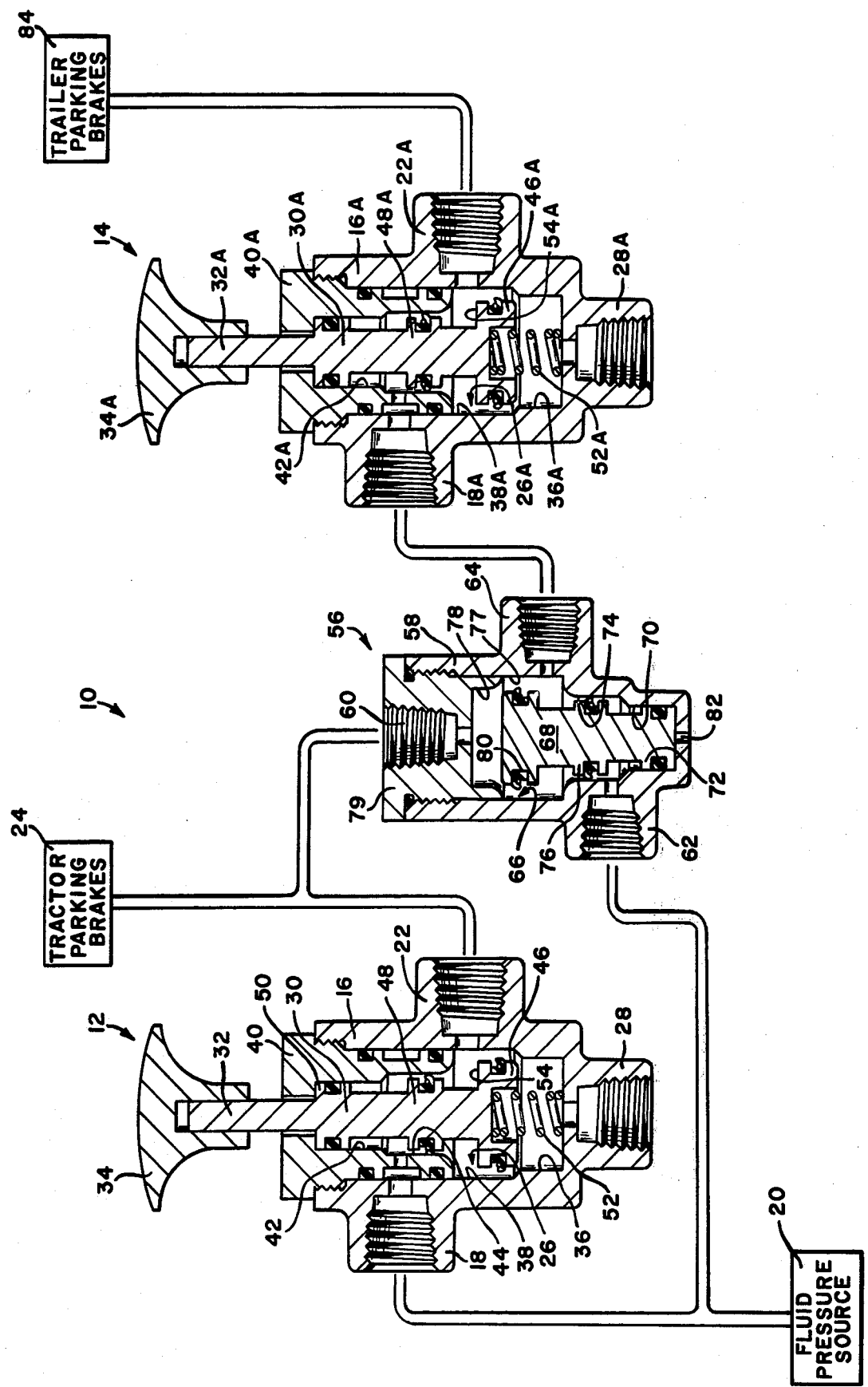

FLUID PRESSURE BRAKING SYSTEM

BACKGROUND OF THE INVENTION

This invention relates to a control valve arrangement for an articulated vehicle having separate parking brake systems on the powered, or tractor, portion thereof and on the nonpowered, or trailer, portion thereof.

Existing tractor-trailer articulated vehicles are commonly supplied with separate parking brake systems on the tractor and trailer portions thereof. Commonly, these parking brakes are of the conventional spring applied, fluid pressure released type well known to those skilled in the art. These braking systems require communication of fluid pressure to the parking brakes to release the parking brakes, and permit application of the parking brakes by venting this hold-off pressure when the vehicle is parked or under emergency conditions. As can be appreciated by those skilled in the art, existing parking brake control systems are relatively complicated, and require at least three manually operated valves and an additional control valve in order to completely control communication to the parking brakes. Not only is this system unduly complicated, but the control valves themselves are relatively expensive, so that elimination of one or more of these valves is obviously desirable. Furthermore, these prior art systems may actuate the tractor brakes alone by operation of a single one of these valves. This is undesirable, since in the usual situation, both the tractor and trailer parking brakes should be applied simultaneously, although there will be instances when the trailer parking brakes must be later released after a parking brake application while the tractor parking brakes are maintained in their applied condition.

SUMMARY OF THE INVENTION

Therefore, an important object of my invention is to simplify the dash control valve system in tractor-trailer or articulated vehicles by eliminating one or more of the valves used in existing systems, to thereby reduce the cost of the system and also to simplify the system.

Another important object of my invention is to provide a control valve system for a vehicle parking brake system in which no single valve can directly apply the parking brakes of the tractor without also applying the parking brakes of the trailer, but in which the parking brakes of the trailer can be separately released by actuating one of the valves after actuation of the valves has applied the parking brakes on both the tractor and the trailer, thereby enabling the parking brakes of the tractor to be applied alone.

DESCRIPTION OF THE DRAWINGS

The sole FIGURE of the drawing is a partial schematic of a vehicle fluid pressure braking system using my invention, with the various valves used therein illustrated in cross-section.

DETAILED DESCRIPTION

Referring now to the drawings, the vehicle fluid pressure control valve system is generally indicated by the numeral 10 and includes a pair of substantially identical, manually operated, fluid pressure control valves generally indicated by the numerals 12 and 14 respectively. Since, the valves 12 and 14 are substantially identical, elements of the control valve 14 which are the same or substantially the same as similar elements of control valve 12 retain the same reference character, but are suffixed by the letter A.

The manually operated valve 12 includes a housing 16 having an inlet or supply port 18 which is connected to a fluid pressure source 20. The fluid pressure source 20 is, conventionally, the air reservoir of a vehicle air brake system. The housing 16 also carries an outlet or delivery port 22, which communicates hold-off pressure to conventional spring applied, fluid pressure released parking brakes on the tractor portion of the articulated vehicle generally indicated by numeral 24. As discussed hereinabove, the hold-off pressure communicated to brakes 24 overcomes the force of the spring, to thereby release the parking brakes. However, when this holdoff pressure is vented, the springs provide mechanical actuation of the parking brakes. The housing 16 defines a bore 26 therewithin, which communicates the supply port 18 with the delivery port 22 and with an exhaust port 28 which is also carried on the housing 16. An axially movable valve element or spool generally indicated by the numeral 30 is slidably mounted within the bore 26, and one end 32 thereof projects from the bore 26 and is provided with a knob 34 which may be actuated by the vehicle operator.

The bore 26 is stepped to define a smaller diameter portion 36 and a larger diameter portion 38. A plug 40 is received in the end of the larger diameter portion 38, and the internal circumferential surface of the plug 40 is stepped to define a smaller diameter portion 42 and a larger diameter portion 44. The valve member or spool 30 includes a larger diameter portion 46 which can sealingly engage the portion 36 of the bore 26 to thereby close communication to the exhaust port 28. When the valve is in the position illustrated in the drawing, however, the portion 46 is disposed in the larger diameter portion 38 of the bore 26. Valve member 30 also includes an intermediate diameter portion 48 which in the position illustrated in the drawing sealingly engages the portion 44 of the plug 40, but which may be moved to the larger diameter portion 38 when the valve member 30 is moved downwardly viewing the FIGURE. The valve member 30 further includes a smaller diameter portion 50 which remains sealingly engaged in the portion 42 of plug 40 at all times, to thereby maintain the pressure integrity of the bore 26.

A spring 52 yieldably urges the valve member 30 upwardly viewing the drawing, into the position illustrated. However, when the vehicle operator applies pressure to the knob 34, the valve member 30 is shifted downwardly viewing the FIGURE so that the portion 46 can sealingly engage the portion 36 of the bore 26 to thereby close off the exhaust port 28. When this occurs, the portion 48 will be moved into the portion 38 of the bore 26, to thereby initiate communication between the ports 18 and 22, which was prevented when the valve element 30 is disposed in the position illustrated in the drawing. As is well known to those skilled in the art, and as discussed in U.S. Pat. No. 25,969, owned by the assignee of the present invention and incorporated herein by reference, when the valve element 30 is disposed in the position in which the larger diameter portion 46 is sealingly engaged with the portion 36 of bore 26 to thereby permit uninhibited fluid communication between the ports 18 and 22, the relatively high pressure fluid in the system acting against the effective area of the surface 54 of the portion 46 maintains the valve in the position closing the exhaust port 28 even after the vehicle operator has removed his hand from the knob 34, since the force created by the fluid pressure in the bore 26 acting against the effective area of the surface 54 is stronger than the pressure required to overcome the effects of the spring 52. However, when the pressure level in the system falls below a predetermined low level governed by the strength of the spring 52, the latter will cause the valve 12 to "pop out" into the position illustrated in the drawing, thereby venting the hold-off pressure from the parking brakes to the exhaust 28, thereby effecting an automatic application of the parking brakes when the pressure in the system falls to some predetermined low level.

System 10 further includes a dual supply valve generally indicated by the numeral 56. The dual supply valve 56 includes a housing 58 having a first inlet or supply port 60 connected to the outlet or delivery port 22 of the manually operated valve 12, a second inlet or supply port 62 which is connected directly to the fluid pressure source 20, and an outlet or delivery port 64 which is connected to the inlet or supply port 18A of the valve 14. The housing 58 defines a bore 66 therewithin which slidably receives a piston 68. The bore 66 includes a smaller diameter portion 70 which slidably and sealingly receives smaller diameter portion 72 of the piston 68, a portion 74 of intermediate diameter which slidably and sealingly receives portion 76 of piston 68 of a corresponding diameter, and a larger diameter portion 77 which receives plug 79. The inner surface of plug 40 defines another intermediate diameter 78 which slidably and sealingly receives large diameter portion 80 of the piston 68. A vent 82 communicates the portion of the bore 66 between the smaller diameter portion 72 of piston 68 and the enclosed end of the bore 66 with the atmosphere. Accordingly, it will be noted that, when the piston 68 is disposed in the position illustrated in the drawing, that pressures at ports 60 and 62 are in opposition to one another across the portion 76 of piston 68. When the pressure level in the port 60 drops, the pressure level at port 62, which is a substantially constant pressure which is generated by the source 20, yields the piston 68 upwardly viewing the FIGURE, causing the larger diameter portion 80 to sealingly engage the portion 78 in the bore 66, thereby terminating communication between the supply or inlet port 60 and the delivery or outlet port 64. At the same time, the portion 76 will be urged in to the larger diameter portion 77 of the bore 66, thereby initiating fluid communication between the supply port 62 and the delivery port or outlet 64. The fluid pressure level at which the piston 68 is shifted upwardly viewing the FIGURE is less than the fluid pressure level at which the spring 52A urges the valve member 30A upwardly viewing the drawing. When pressure is again available at port 60, the fluid pressure at this port acting across the effective area of portion 80 of piston 68 urges the latter back into the position illustrated in the FIGURE.

Referring now to the control valve 14, as discussed hereinabove, the elements of the control valve 14 are substantially the same as those in the control valve 12. The only substantial differences in the control valve 14 as compared to control valve 12 are that the supply port 18A is communicated to the delivery or outlet port 64 of the dual supply valve 56, whereas the inlet or supply port 18 of the valve 12 is communicated directly to the fluid pressure source 20. Furthermore, the delivery port or outlet 22A of the valve 14 is communicated to the trailer parking brakes generally indicated by the numeral 84. These trailer parking brakes are also spring applied, fluid pressure released brakes similar to parking brakes 24 mounted on the tractor, and are well known to those skilled in the art. Finally, the spring 52A has a lower force than does the spring 52, so that the valve member 30A "pops out" at a lower pressure level than does the valve member 30. However, the pressure level at which the valve member 30A "pops out" is higher than that required to shift the piston 68 of the dual supply valve 56.

MODE OF OPERATION

When the vehicle engine is started and the vehicle is to be moved, the vehicle operator manipulates the knob 34 of the valve 12 to move the valve member 30 into the aforementioned position closing the exhaust port 28 and communicating the inlet or supply port 18 with the outlet or delivery port 22, thereby communicating fluid pressure from the fluid pressure source 20 to the tractor parking brakes 24, to release the spring application of the latter. At the same time, fluid pressure is communicated from the delivery port 22 through the supply or inlet port 60 of the dual supply valve 56, to the delivery or outlet port 64 of the latter and to the supply or inlet port 18A of the valve 14. Since, until the valve member 30A of the valve 14 is moved into the actuated position communication between the inlet or supply port 18A and the outlet or delivery port 22A is prevented, the tractor brakes alone will be released, but the vehicle cannot be moved until the trailer parking brakes are also released. Therefore, in order to effect a complete release of the vehicle's brakes, the vehicle operator must actuate both the valves 12 and 14, so that fluid pressure is communicated both to the tractor parking brakes 24 and to the trailer parking brakes 84.

A parking or emergency brake application may be made either by the vehicle operator manipulating the knob 34 of the valve 12, or by the fluid pressure level at the source 20 dropping below a predetermined level below that established by the spring 52, causing the valve element 30 to "pop out" into the position shown. In either case, communication between the supply or inlet port 18 and the outlet or delivery port 22 is terminated, and fluid communication between the outlet or delivery port 22 and the exhaust port 28 is initiated, thereby reducing the hold-off pressure at the spring brakes 24 to substantially atmospheric pressure, causing the spring brakes 24 to effect a spring or mechanical brake application. At the same time, since the piston 68 remains in the position illustrated in the drawing, the pressure at the supply port 18A of the valve 14 will similarly be reduced. When this pressure is reduced below that set by the spring 52A, the valve element 30A of the valve 14 "pops out," thereby venting the trailer parking brakes 84 to the exhaust port 28A and thereby effecting a trailer brake application. It will be noted that, since the pressure level established by the spring 52A at which the valve member 30A "pops out" is less than that established by the valve spring 52, in case of a loss of pressure in the entire system the valve member 30 will "pop out" first, and the valve member 30A will then "pop out", since when valve member 30 "pops out," the delivery, or outlet, port 22 will be connected to exhaust 28, thereby rapidly reducing the pressure in the supply port 18A of the valve 14 to atmospheric pressure, and causing the valve spring 52A to "pop out" the valve member 30A. After the valve 12 has been manually actuated as described hereinabove, the pressure level at the supply or inlet port 60 of the dual supply valve 56 will first fall to a level causing the valve spring 52A to "pop out" the valve member 30A of valve 14, and will thereafter continue to decrease to substantially atmospheric pressure. When the pressure at the supply port 60 falls below the level necessary to cause the pressure level at supply or inlet port 62 to urge the valve 68 upwardly viewing the drawing, the supply or inlet port 62 will be communicated to the delivery port 64, thereby communicating fluid pressure from the source 20 directly to the supply port 18A. Since, in this case, the pressure level had already dropped below that necessary for the valve spring 52A to "pop out" the valve member 30A, the valve 14 will be in the condition illustrated in the drawing. Therefore, the pressure communicated from the source 20 to the supply port 18A through the supply or inlet port 62 and delivery or outlet port 64 of the dual supply valve 56 cannot be communicated directly to the trailer parking brake actuators until the knob 34A is manipulated by the vehicle operator. Consequently, the vehicle operator can effect release of the trailer brakes while maintaining the tractor brakes applied by first moving the knob 34 into the position illustrated in the drawing to apply both the tractor and trailer parking brakes by venting them to atmosphere through corresponding exhaust ports 28 or 28A, and thereafter pushing the knob 34A downwardly viewing the FIGURE to communicate fluid pressure directly from the source 20 to the trailer brakes 84 while maintaining the tractor parking brakes vented to atmosphere.

I claim:

1. In a fluid pressure braking system for an articulated vehicle comprising a tractor and a trailer, said tractor and trailer each having fluid pressure released parking brakes, a fluid pressure source, a control arrangement for controlling fluid communication from said source to said parking brakes including first valve means having an inlet connected to said source, an outlet connected to the parking brakes on the tractor, an exhaust, a valve member slidably mounted in said first valve means and operable for manual movement from a first position closing communication between the inlet and outlet and communicating the latter to said exhaust, said valve member being movable to a second position closing said exhaust and communicating the inlet with the outlet, and second valve means having an inlet connected to the outlet of said first valve means, an outlet connected to the parking brakes on the trailer, an exhaust, valve mechanism slidably mounted in said second valve means and operable for manual movement from a first condition closing communication between the inlet and outlet and communicating the latter to said exhaust, said valve mechanism being movable to a second condition closing said exhaust and communicating the inlet with the outlet, and structure responsive to the pressure level within such second valve means for yieldably urging said valve mechanism to said condition when said pressure level drops below a predetermined level.

2. The invention of claim 1:
and means controlling communication between said first and second valve means and said pressure source, said communication controlling means having a first inlet connected to the outlet of the first valve means, a second inlet connected to said pressure source, an outlet communicated to the inlet of the second valve means, and means responsive to the pressure level at the first inlet of the communicating means normally communicate the first inlet with the outlet, but communicating the second inlet with the outlet when the pressure level at the first inlet drops below a predetermined level.

3. In a fluid pressure braking system for a vehicle having a fluid pressure source and first and second sets of fluid pressure released parking brakes, control mechanism comprising first valve means having an inlet connected to said pressure source, an outlet connected to one set of said parking brakes, an exhaust, and a valve member controlling fluid pressure communication therebetween, second valve means having an inlet, an outlet communicated to said second set of parking brakes, an exhaust, and a valve member controlling communication therebetween, and pressure differential responsive means for comparing the pressure levels at the outlet of the first valve means with a predetermined pressure level and normally communicating said outlet of the first valve means to the inlet of the second valve means, but communicating the inlet of said second valve with the predetermined pressure level when the pressure level at the outlet of the first valve means drops below a predecided pressure level.

4. The invention of claim 3:
wherein said predetermined pressure level is equal to the pressure level at the inlet of the first valve means.

5. The invention of claim 3:
wherein said pressure differential responsive means includes a pair of pressure responsive pistons having a larger effective area exposed to the fluid pressure level at the outlet of the first valve means and a smaller opposing effective area exposed to the fluid pressure level of said predetermined pressure source.

6. The invention of claim 5:
wherein said first valve means includes means responsive to the pressure level within said first valve means for automatically terminating communication between the inlet and outlet of the first valve means and initiating communication between the outlet and exhaust of the first valve means when the pressure level within said first valve means drops to a predetermined level.

7. The invention of claim 6:
wherein said second valve means includes means responsive to the pressure level within said second valve means for automatically terminating communication between the inlet and the outlet of the second valve means and initiating communication between the outlet and exhaust of the second valve means when the pressure level within the second valve means drops to a pre-established level, said pre-established pressure level being less than the predetermined pressure level at which the first valve means automatically communicates the outlet and exhaust of said first valve means.

8. The invention of claim 7:
wherein said predecided pressure level is less than said pre-established low pressure level.

9. The invention of claim 3:
wherein said first valve means includes means responsive to the pressure level within said first valve means for automatically terminating communication between the inlet and outlet of the first valve means and initiating communication between the outlet and exhaust of the first valve means when the pressure level within said first valve means drops to a predetermined low level.

10. The invention of claim 9:
wherein said second valve means includes means responsive to the pressure level within said second valve means for automatically terminating communication between the inlet and the outlet of the second valve means and initiating communication between the outlet and exhaust of the second valve means when the pressure level within the second valve means drops to a pre-established level, said pre-established pressure level being less than the predetermined pressure level at which the first valve means automatically communicates the outlet and exhaust of said first valve means.

11. The invention of claim 10:
wherein said predecided pressure level is less than said pre-established low pressure level.

12. In a fluid pressure braking system for a vehicle having a fluid pressure source and first and second sets of fluid pressure released parking brakes, control mechanism comprising first valve means controlling communication between said fluid pressure source, said first set of parking brakes, and an exhaust, second valve means controlling communication between said fluid pressure source, said second set of parking brakes, and an exhaust, and pressure responsive means connected between the first valve means, the second valve means and said fluid pressure source for causing said second valve means to automatically communicate said second set of parking brakes to the exhaust when the first valve means communicates the first set of parking brakes to the exhaust.

13. The invention of claim 12:
wherein said pressure responsive means terminates communication from said first valve means to the second valve means when the pressure level in the first valve means drops below a predetermined level whereupon said pressure responsive means communicates fluid pressure from said source to said second valve means.

14. The invention of claim 13:
wherein said first and second valve means each have an inlet and an outlet in addition to their exhausts, the inlet and outlets of said first valve means being connected to said pressure source and to said pressure responsive means respectively, said outlet of said first valve means also being connected to said first set of parking brakes, said second valve means having an inlet connected to said pressure responsive outlet communicated to said second set of parking actuators.

15. The invention of claim 14:
wherein said pressure responsive means includes a first inlet communicated to the outlet of the first valve means, an outlet connected to the inlet of the second valve means, a second inlet connected to said pressure source, and means responsive to the pressure level at said first inlet to communicate said outlet with the second inlet when the pressure level at said first inlet drops below a predetermined level.

16. The invention of claim 15:
wherein said first valve means includes means responsive to the pressure level within said first valve means for automatically terminating fluid communication between the inlet and outlet of the first valve means and initiating fluid communication between the outlet and exhaust of the first valve means when the pressure level in said first valve means drops below a predecided level, said predecided level representing a pressure level greater than that represented by said predetermined level.

17. The invention of claim 16:
wherein said second valve means includes means responsive to the pressure level within said second valve means for automatically terminating communication between the inlet and the outlet of the second valve means and initiating communication between the outlet and exhaust of the second valve means when the pressure level within the second valve means drops to a pre-established level, said pre-established level representing a pressure level greater than said predetermined level but less than said predecided level.

18. The invention of claim 14:
wherein said second valve means includes means responsive to the pressure level within said second valve means for automatically terminating communication between the inlet and the outlet of the second valve means, and initiating communication between the outlet and exhaust of the second valve means when the pressure level within said second valve means drops to a pre-established level.

* * * * *